United States Patent

[11] 3,610,609

[72] Inventor Leonard H. Sobel
 452 Beach 138th St., Rockaway Park, N.Y. 11694
[21] Appl. No. 792,737
[22] Filed Jan. 21, 1969
[45] Patented Oct. 5, 1971

[54] DEFORMABLE SHOCK-ABSORBING GUARD
 18 Claims, 33 Drawing Figs.
[52] U.S. Cl. .................................................. 267/140,
 188/1 C, 213/1 A, 213/221, 267/152, 293/1,
 293/60, 293/63, 293/65, 293/70, 293/71, 293/86
[51] Int. Cl. ......................................................... B60r 19/00,
 F16d 63/00, F16f 13/00
[50] Field of Search ....................................... 213/221, 1
 A, 224; 244/1; 293/1, 63, 64, 65, 66, 67, 70, 71,
 85, 86, 60; 267/139, 140, 141, 151, 152; 188/1 C,
 268; 325/112

[56] References Cited
UNITED STATES PATENTS

| | | | |
|---|---|---|---|
| 1,099,429 | 6/1914 | Dargaczemski | 293/71 X |
| 2,074,469 | 3/1937 | Haynes | 293/63 |
| 2,251,347 | 8/1941 | Williams et al. | 213/221 |
| 2,517,860 | 8/1950 | Forgy | 244/1 |
| 2,716,040 | 8/1955 | Barenyi | 296/28 |
| 2,829,915 | 4/1958 | Claveau | 293/71 P |
| 2,873,994 | 2/1959 | Omps | 293/86 |
| 2,965,403 | 12/1960 | Barenyi et al. | 293/63 |
| 2,997,325 | 8/1961 | Peterson | 293/1 |
| 3,008,746 | 11/1961 | Senger | 293/70 |
| 3,056,620 | 10/1962 | Adams et al. | 293/71 |
| 3,378,296 | 4/1968 | Crocker | 293/65 X |
| 3,493,257 | 2/1970 | Fitzgerald et al. | 293/63 X |
| 3,494,607 | 2/1970 | Rusch | 293/63 X |
| 2,724,463 | 11/1955 | Becker | 188/268 |
| 2,857,510 | 10/1958 | Haggerty et al. | 325/112 |
| 3,265,163 | 8/1966 | Gilbert et al. | 188/1 C |
| 3,307,868 | 3/1967 | Blank | 293/70 |

*Primary Examiner*—Arthur L. La Point
*Assistant Examiner*—Howard Beltran
*Attorney*—Sparrow and Sparrow

ABSTRACT: Devices for vehicles or the like to reduce shock of collision by utilizing energy absorbing material which compresses under the force of impact of collision offering increased resistance and effecting gradual momentum deceleration of the moving vehicle as it is being compressed.

PATENTED OCT 5 1971

INVENTOR.
LEONARD H. SOBEL

BY SPARROW AND SPARROW
ATTORNEYS

INVENTOR.
LEONARD H. SOBEL
BY
SPARROW AND SPARROW
ATTORNEYS

INVENTOR.
LEONARD H. SOBEL
BY
SPARROW AND SPARROW
ATTORNEYS

INVENTOR.
LEONARD H. SOBEL
BY
SPARROW AND SPARROW
ATTORNEYS

PATENTED OCT 5 1971

INVENTOR.
LEONARD H. SOBEL

BY

SPARROW AND SPARROW

ATTORNEYS

DEFORMABLE SHOCK-ABSORBING GUARD

BACKGROUND OF THE INVENTION

The invention relates to vehicle crash guard devices which provide protection against personal injury and property damage during collision. Existing impact resistant devices for vehicles usually employ rubber strips mounted on front and rear bumpers. When the rubber is compressed, as during the impact of collision, its reaction is practically instantaneous expansion causing the colliding vehicles to rebound or recoil from each other. For example, when a standing vehicle is struck in the rear by another moving vehicle, the rebounding or springing back on collision or impact frequently results in whiplash effect on the passenger which increases the chances of neck, back and spinal injuries. Rubber mounted on rigid metal has poor energy absorbing qualities and provides little or no prohibition during collision at high speeds. The same disadvantage is applicable when using spring devices which do not absorb gradually and furthermore expand rapidly after impact causing the vehicle to recoil or bounce back.

The foregoing disadvantages have been overcome by the device according to the invention which utilize energy-absorbing material which compresses under the force of impact, offering increased resistance as it is compressed.

As matter is compressed and density of the mass thus increased, the ability to be compressed further is decreased and its resistance to the compressing force acting thereon is increased as compression on a compressible substance occurs. This resistance increases at a gradual rate, and since the applied force has more work to do as it encounters the ever increasing resistance, it is expended and diminished as it overcomes the resistance. When force in the form of a rapidly moving body is applied to a compressible substance, its speed will be reduced gradually while the kinetic energy is dissipated and as the compressive substance increases in density and offers progressively more resistance to the oncoming body.

If the compressible substance described above has not reached the threshold of total compression from point of impact to dissipation of compressing force, it has then served as an effective device for energy absorption. But if the compressible substance has reached its threshold of total compressibility and the compressing force (kinetic energy in the case of moving bodies) is not yet dissipated, then the compressible substance has not served as an effective device—as an absorber of energy. Therefore, it is an intent of the present invention to overcome the disadvantages inherent in existing crash or collision guards by providing devices by which the protection of any colliding body such as, for example, a vehicle can be increased by causing or compelling it to come to rest before the compressible matter it is making impact with has not yet reached its relative state of total compressibility.

SUMMARY

The invention consists in such novel features, construction, arrangements, combinations of parts and improvements as may be shown and described in connection with the devices herein disclosed by way of examples only and as illustrative of preferred embodiments. The novel structures of the improved crash guards for vehicles or the like constitute devices which utilize suitable energy absorbing material which compresses under the force of impact occurring for example in collisions, offering increased resistance as said material is being compressed. When material according to the invention is between colliding bodies and is compressed by the force of impact of collision its volume decreases but its density increases gradually, offering increased resistance and effecting gradual momentum deceleration. This gradual deceleration as opposed to sudden stop reduces the probability of physiological damage (personal injury) and vehicle damage. The ability of said material to compress during collision with protracted return or little or no rebound reduces the degree of whiplash effect on passengers, thus reducing personal injury and property damage potential.

It is an object of the present invention to provide a device utilizing energy or shock-absorbing material which compresses under the force of impact offering, increased resistance as it is compressed.

Another object of the present invention is to provide energy-absorbing cellular material that will not reach a state of total compression when subjected to maximum compression load.

It is a further object of the present invention to provide means for housing said energy-absorbing material.

Another object of the present invention is to provide means by which the support, such as a rigid mounting plate or housing for said energy-absorbing material may be mounted, for example, on the bumper of a vehicle, and/or arranged as a piston, attached to the chassis of the vehicle behind the bumper.

It is a still further object of the present invention to provide a pressure plate at the front of the energy-absorbing material so that any force applied to the said shock or energy absorbent material will be distributed equally over its entire surface and through its entire mass. In such case the front pressure plate should be movable with respect to the vehicle to achieve the desired action on collision.

Yet another object of the present invention is to provide a rear plate rigidly mounted to the vehicle for supporting total pressure transmitted to it by the energy-absorbing material. Various further and more specific purposes, objects, features and advantages will clearly appear from the detailed description given below taken in connection with the accompanying drawings which form part of this specification and illustrate merely by way of examples embodiments of the devices of the invention.

BRIEF DESCRIPTION OF THE DRAWINGS

In the following description and in the claims, parts will be identified by specific names for convenience, but such names are intended to be as generic in their application to similar parts as the art will permit. Like reference characters denote like parts in the several figures of the drawings in which:

FIG. 19 is a perspective view of a piston arrangement including compressible material, attached to the chassis of a vehicle;

FIG. 20 is a sectional view of a crash guard arrangement similar to FIG. 19;

FIG. 21 is a sectional view similar to FIG. 20, but showing the compressible material under compression due to head-on impact;

FIG. 22 is a sectional view similar to FIG. 21, showing the condition of the crash guard device when the impact results from an impact other than head on;

FIG. 23 represents a modified form of compressible material employable in the invention.

FIG. 24 represents a further modified form of compressible material;

FIG. 25 shows a type of compressible material embodying substances having different energy-absorbing qualities;

FIG. 26 shows the material typified in FIG. 25, when under compression;

DESCRIPTION OF THE PREFERRED EMBODIMENTS

In the crash guard system according to the invention, the compressible materials selected as the energy or shock-absorbing means required to carry out the intent of the invention fall into certain classes or categories, the most preferable being flexible foam plastics which may be of open or closed cell structure and/or rigid-type foams which may be crystaline in structure and crushable. The rigid-type foams may be of open or closed cell structure. A further type of energy or shock absorbing means may comprise a cellular structure in which fluid, such as air, liquid, paste, etc. is encased in the cells thereof. The quality of the compressible materials to be selected should be such that they should have relatively low density when relaxed and high density when compressed and that they should be compressible with protracted return or little or no rebound.

In the crash guard system, a flexible cover or housing is provided which removably encases the rigid crushable and compressible materials. This compressible or energy-absorbing material may be removed after a collision occurs and replaced by a cartridge unit of like material. If, for example, a rigid or semirigid foam is used as the cartridge, collision would crush the rigid crushable material therein thereby rendering it incapable of future energy absorption. In such a case a new cartridge can be easily installed.

Reference will now be made to the drawings which disclose various modes of carrying out the invention.

Figure 1:
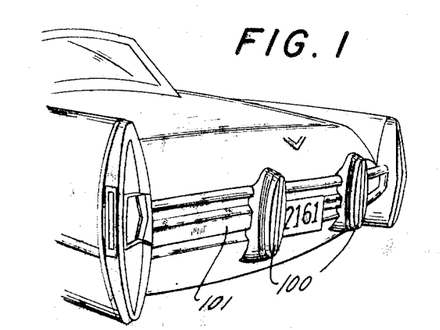
FIG. 1 is a perspective of the rear portion of a motor vehicle to which a crash guard embodying the invention is attached thereto.
Figure 2:
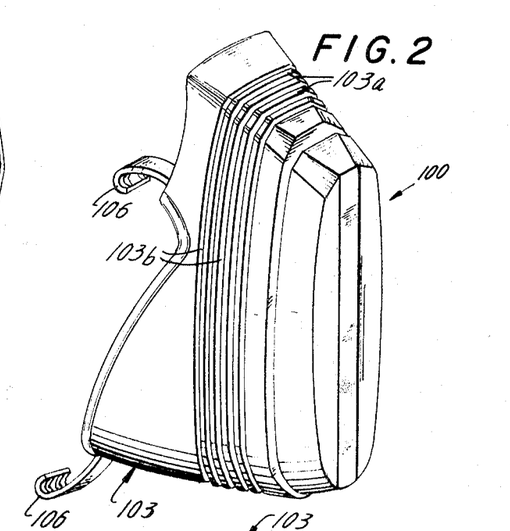
FIG. 2 is a perspective view of the crash guard seen in FIG. 1.
Figure 3:
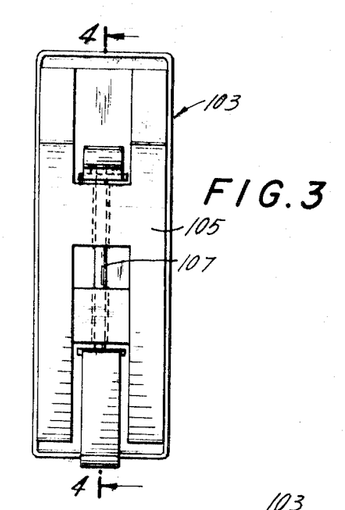
FIG. 3 is a rear view of the crash guard attached to the vehicle.
Figure 4:
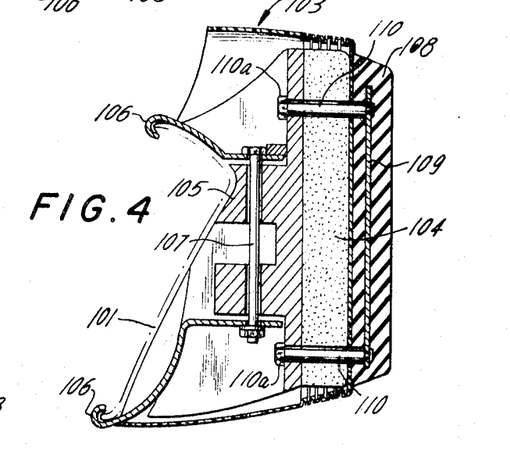
FIG. 4 is a sectional view of the crash guard attached to the vehicle; showing the crash guard in normal position, that is, at rest.

FIG. 1 is a perspective view of a motor vehicle to which crash guards 100 have been installed on rear bumper 101. As seen in FIGS. 2 and 4, crash guard 100 has a flexible housing or cover 103 within which is contained the energy-absorbing or compressible material 104.

Figure 6:
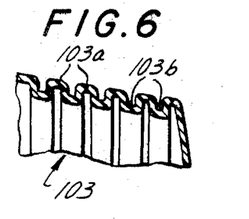
FIG. 6 is a detail view of a portion of a collapsible shell housing the compressible material showing the shell in its normal expanded condition.
Figure 7:
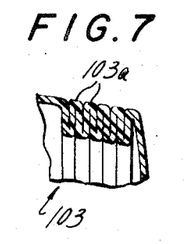
FIG. 7 is a similar detail showing the shell in its compressed condition.

Housing or cover 103 comprises a flexible shell having vertically or peripherally disposed bellows, accordion or expandable and retractable pleats or accordionlike lands or ridges and grooves, 103a and 103b, respectively (FIGS. 6,7), which permit greater resiliency in the shell 103 upon collision. Grooves 103b of shell or housing 103 preferably have reduced wall thickness to facilitate collapse of the shell during collision. Compressible or crushable material 104 rests on a rear pressure or backing plate 105 which is rigidly attached to the vehicle bumper 101 by means of clamps 106 secured to the rear portion of plate 105 by draw bolt 107. Secured to the outer face of housing or shell 103 there may be provided a resilient impact member 108 made of suitable material. For this purpose, member 108 is provided with a rigid front pressure plate or insert member 109 and bolts 110 slidably disposed through the forward portion of rear or back plate 105, the bolts 110 being secured to front pressure plate or insert 109.

Figure 5:
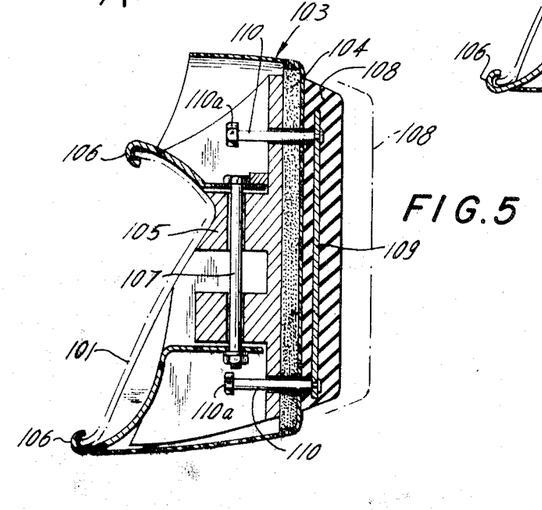
FIG. 5 is a sectional view similar to FIG. 4, showing the crash guard when under the force of impact.

As seen in FIG. 5 upon a collision occurring, for example, by impact with an oncoming vehicle, rigid plate 109 acts as a pressure plate in that it distributes the force of impact on the total area of the energy-absorbing material 104, thus compressing the latter. At the same time flexible housing 103 compresses and bolts 110 retract or slide inwardly permitting pressure plate 109 to traverse the stroke. The transverse inward movement of impact member 108 with its internal rigid pressure plate 109 is indicated by the position of impact member 108 from dot-dash position to retracted position (FIG. 5).

To replace the cartridge 104 of compressible or crushable material, all that is necessary is to remove the nuts 110a from bolts 110 and then slidingly withdraw impact member 108, remove the crushed cartridge 104 and replace the latter with a functionable new cartridge 104, replace impact member 108 and fasten the nuts 110a on bolts 110.

It is understood that replacement of the cartridge is only necessary when the compressible material is, for example, of crystalline structure and is crushed during impact. Resilient type compressible material which has memory, and thus returnable to initial dimensions may not require replacement after a collision.

Housing or shell 103 may be made of any suitable resilient material, such as plastic or other synthetic material, or rubber or rubber-type material. Also the rear portion 103a may be made of metal and the accordion portion may be made of rubber or synthetic material, plastic in nature.

FIGS. 8 to 11 show a crash guard in a modified form, wherein the accordion construction is omitted. Housing or shell 120 is shaped to provide a pocket 121, the wall 122 of which abuts against backing plate 105. The compressible material 104 is contained in pocket 121. Thus material 104 upon a collision of a second vehicle with the crash guard will compress within pocket 121. The pocket is dimensioned so as to form a large enough cavity to permit impact member 108 and compressible material 104 to move transversely therein.

Figure 8:
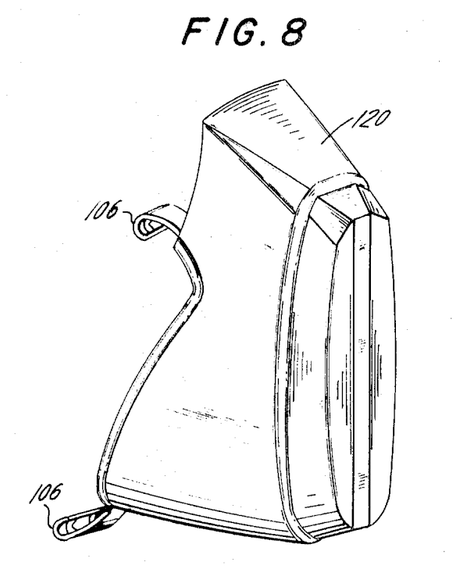
FIG. 8 is a perspective view of a crash guard package similar to FIG. 2, but in a modified form.
Figure 9:
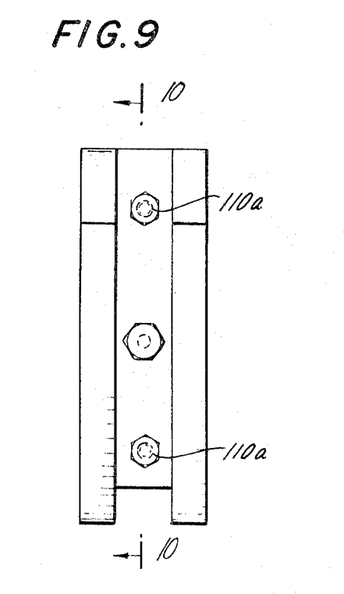
FIG. 9 is a rear view of FIG. 8.
Figure 10:
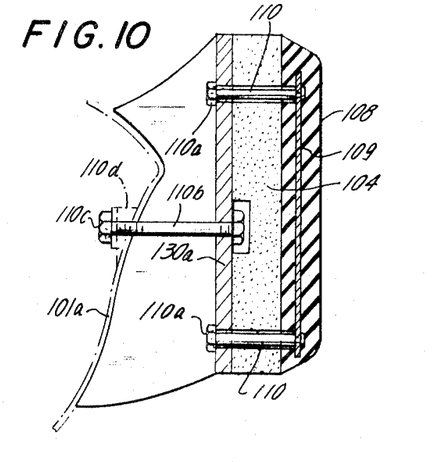
FIG. 10 is a view similar to FIG. 4, but without a shell covering the compression material portion.
Figure 11:
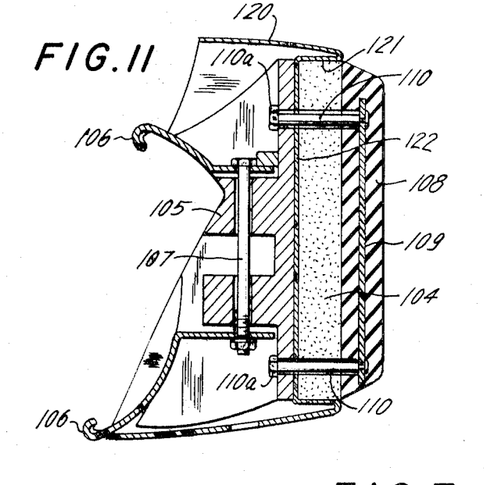
FIG. 11 is a section view of a crash guard according to the invention showing a variation in the housing.

FIG. 10 is a further variation of crash guard, wherein the flexible housing or shell is omitted. In this embodiment the compressible material 104 is disposed between backing plate 130a and impact member 108. Backing plate 130a is secured to bumper 101a by means of bolt 110b and nut 110c, an angled washer 110d providing a flat surface against which the nut is seated. Bolt 110b is used in lieu of clamps 106 (FIGS. 8 and 11).

Figure 12:
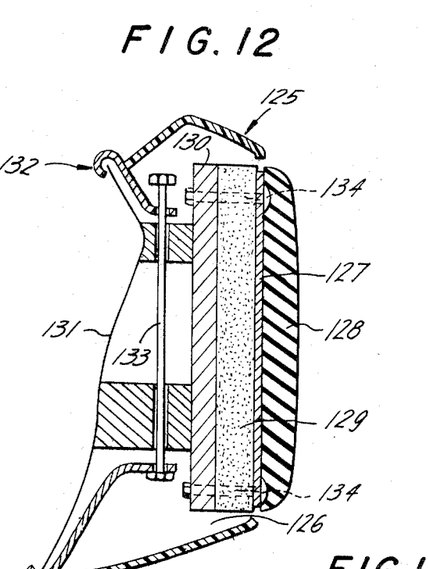
FIG. 12 is a sectional view of a crash guard package, showing a variation of assembling a flexible cover housing the compressible material.

FIG. 12 is a further variation of crash guard which comprises a flexible shell 125 of convenient shape having an open front 126 and which is substantially tubular in construction; an integral rigid pressure plate 127 and flexible impact member 128; a compressible energy-absorbing member 129 intermediate pressure plate 127 and backplate 130, the latter being secured to vehicle bumper 131 by means of clamps 132 connected through draw bolt 133. Impact member 12, pressure plate 127, compressible member 129 and backplate 130 are secured together by means of bolts 134 which are slidably fastened to backplate 130. Upon impact against flexible impact member 128 by a colliding body, impact member 128, pressure plate 127, compressible member 129 will, as a unit recede within flexible shell 125, the said member 129, being compressed by the force of collision.

In the embodiment shown in FIG. 4, the front pressure plate 109 is embedded in the resilient-bumping member 108 which is secured to the front of housing 103. Upon impact of collision, energy-absorbing material 104 will compress and housing 103 will fold or collapse.

In the embodiment shown in FIG. 12, the resilient-bumping material 128 is secured to front pressure plate 127 and is free of contact with the tubular housing 125.

It is to be noted that in FIGS. 4 and 12, respectively, bolts 110, 134, upon compression of energy-absorbing material 104, 129, due to a collision, will slide and project rearwardly in housing 103 or 125.

Figure 18:
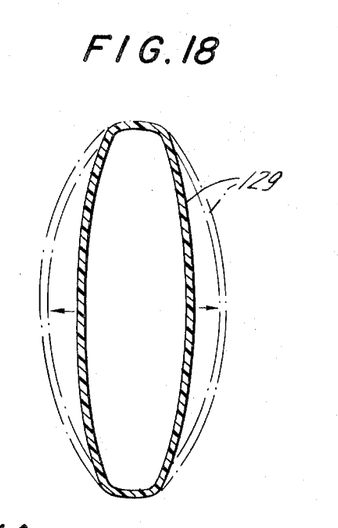
FIG. 18 is a sectional view of expansible cover or shell in normal condition, the same being shown in dot-dash lines in expanded condition when the compressible material therein expands upon impact.

FIG. 18 is a front view of shell 125 (FIG. 12), which shows the normal condition of shell 125 in section and the condition of shell 125 after collision impact, in dot-dash lines. It is to be observed that in the latter condition, the shell expands in width and therefore accommodates the sideways expansion of the compressible member 129 as it flows outward during impact of collision.

Figures 13, 14, 15, 16, 17, 18A, 18B, 18C:
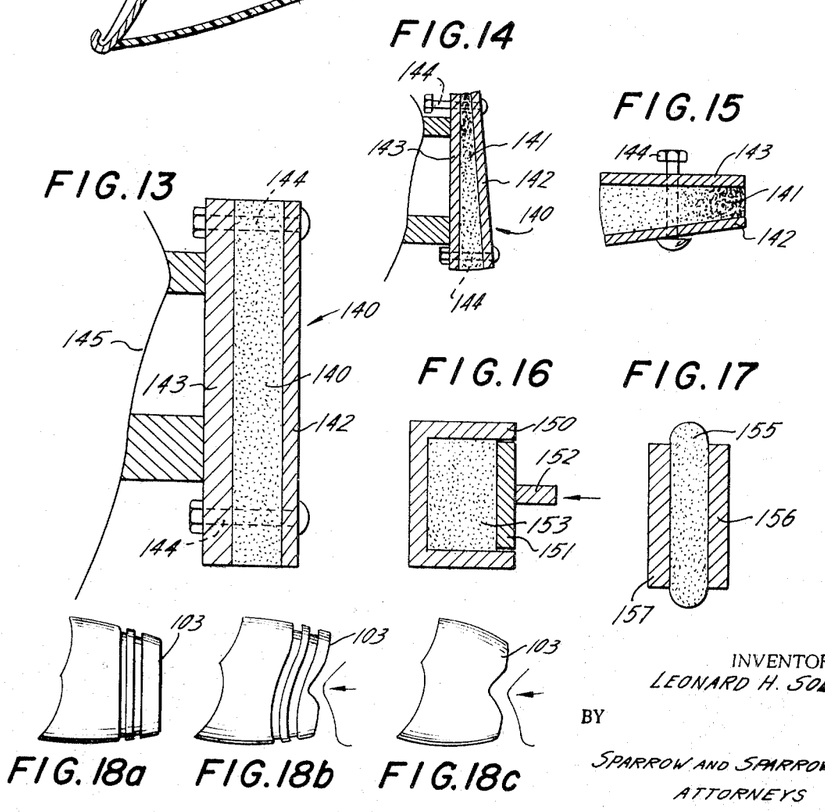
FIG. 13 is a sectional view showing an assembly of crash guard components with the compressible material at rest.
FIG. 14 is a sectional view (reduced in size) of the crash guard seen in FIG. 13, but with the condition of the upper portion of the crash guard upon collision when impacted by a body approaching the top of the crash guard.
FIG. 15 is a top view of the crash guard when impacted by a body approaching the side of the crash guard.
FIG. 16 is a sectional view of a completely encased compressible material, the rigid walls of the casement preventing the expansion of the material when under impact.
FIG. 17 diagrammatically indicates the condition of the compressible material upon impact when the material is not restricted within the casement.
FIG. 18a shows diagrammatically a type of grooved flexible crash guard cover in normal condition.
FIG. 18b shows the crash guard of FIG. 18a after impact.
FIG. 18c shows diagrammatically a type of nongrooved flexible crash guard cover after impact.

FIG. 18a shows diagrammatically the flexible housing or cover 103 (FIG. 2) in normal condition, that is before impact resulting from, for example, collision with another vehicle. FIG. 18b, shows diagrammatically the condition of housing or cover 103 resulting from such impact. FIG. 18c shows diagrammatically the condition of a flexible housing or cover 103a sans grooves and ribs or lands, after such impact. Housing 103a is made of resilient material which may be plastic, rubber or synthetic rubber, or combinations thereof.

When the compressible energy-absorbing member 129 (FIGS. 12, 18) is compressed during collision impact, it flows outwardly in all directions. The crash guard according to the invention utilizes the ability of a resilient housing or cover to yield with this flow and return undamaged to its normal dimensions together with the compressible energy-absorbing member when the colliding vehicle or body is removed.

Where vertical grooves and lands are provided in the resilient housing, they act to reduce the thickness of the housing wall thereat where extreme flexing and bending are required upon collision and further assure collapse upon collision.

The flexibility of the crash guard housing or cover results in reduced damage to vulnerable parts of the colliding vehicles, such as grill and body parts, than would result if rigid-type crash guards were used. Thus the flexible housing or cover of the crash guard cannot become an instrument of additional or further damage. The flexible housing yields and returns to its normal dimensional condition in case of side angle collision. Crash guards using rigid-type housing become permanently deformed and thus destroyed during collision.

In cases where crash guards according to the invention, are installed at the front of a vehicle, upon impact with a pedestrian, the flexible housing will yield resulting in reduced personal injury to the pedestrian struck by such vehicle.

FIG. 13 is a sectional view of crash guard unit 14 comprising compressible energy-absorbing member 141 interposed between front pressure plate or impact member 142 and rear plate 143, in normal condition, which are held together by loosely fitting bolts 144. Rear or backplate 143 is permanently secured to the bumper or the chassis 145 of the vehicle. Bolts 144 loosely and slidingly engage backplate or member 143. Upon impact with another vehicle, front plate or member 142 will retract with compressible member 141, the latter taking up the shock of impact. FIG. 14 shows what occurs when the oncoming vehicle angularly crashes into the crash guard. It is to be observed that compressible member 141 and pressure plate 142 assume an angular position. FIG. 15 is a top view of FIG. 14, showing the position of the pressure plate 142 and the condition of compressible member 141 when collision occurs at an angle. The loose engagement between the bolts 144 and plates 142, 143 allows universal angular movement of the front pressure plate 142.

The arrangement of pressure plate or member 142 and sliding bolts 144 allow piston action on high and low impacts as well as side hits without damage to the crash guard. This pressure plate and slide bolt arrangement allows impact from various angles, and provides a nonrigid system which alters the face angle of the pressure plate angle to receive impact and adjust to the angle of impact. This permits energy-absorbing member 141 to function between the front and rear pressure plates 142, 143, thus assuring maximum possible safety as well as preventing damage to the crash guard.

FIG. 16 is a sectional view of crash guard comprising a casing or housing 150 having an open end accommodating a movable pressure plate or member 151 slidably movable within housing 150. Member 151 is provided with an extension 152. Within housing 150 compressible member 153 is confined. Member 151 bears against compressible member 153. The compressible member 153 is totally encased by housing 150 and pressure member 151, thus preventing flow of compressible member 153 and assuring density buildup upon impact of collision. This will be more fully explained with reference to FIGS. 19–22, wherein the crash guard of FIG. 16 acts as a piston.

FIG. 17 discloses a crash guard comprising compressible member 155 interposed between two pressure plates or members 156, 157, and indicates the possibility of unrestrained flow of compressible member 155 upon impact resulting by collision.

It is obvious that according to the invention the compressible energy-absorbing member may be housed in either a totally enclosed, partially enclosed chamber or between two pressure plates or members and that the compressible material selected should be such as to result in the required degree of energy-absorbing ability affording the proper range of protection against impact of collision. For example, consideration must be given to vehicle weights, variations in speed of colliding vehicles, etc.

Figures 19, 20, 21, 22, 23, 24, 25, 26:
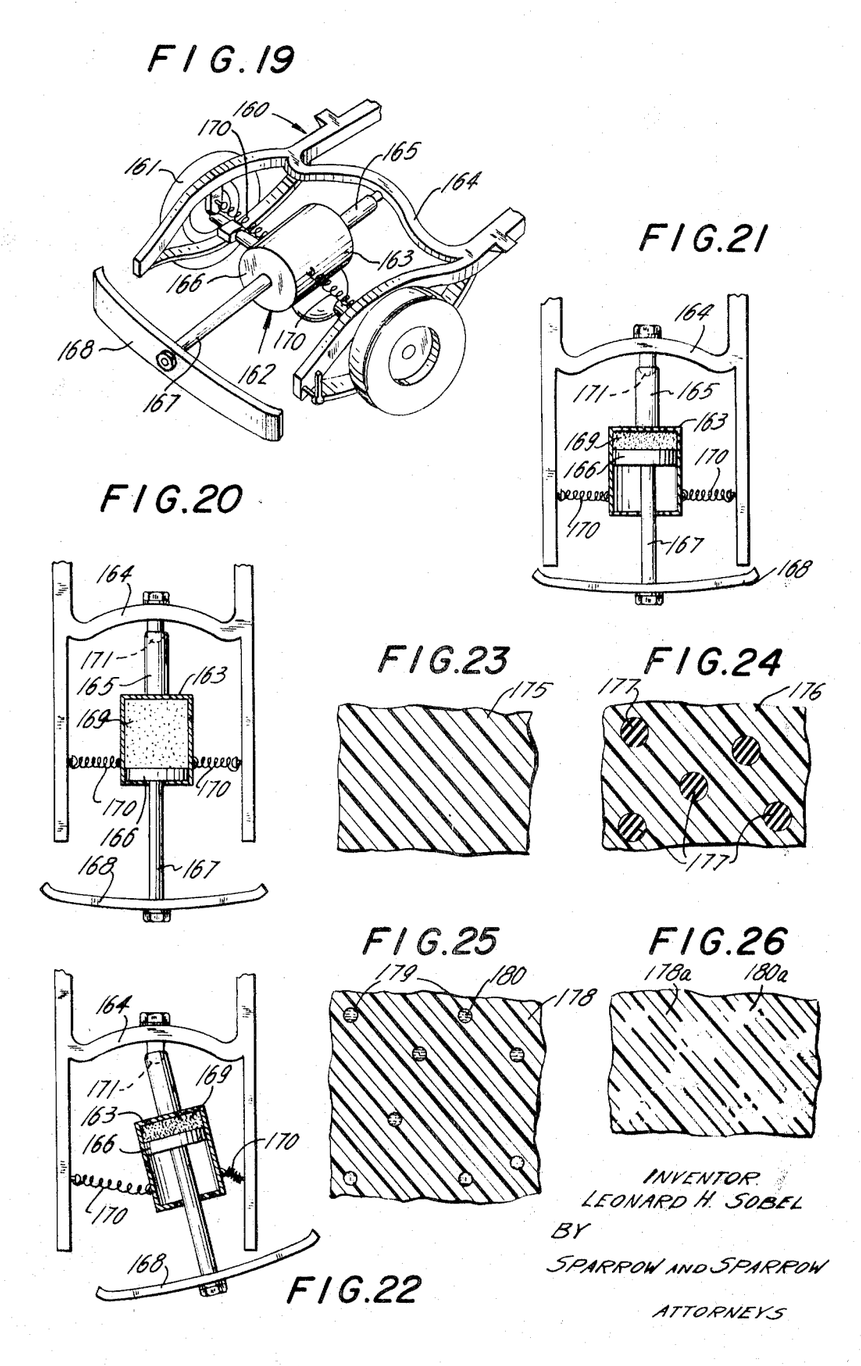

FIG. 19 diagrammatically illustrates the chassis 160 of a vehicle mounted on wheels 161. A crash guard 162 of the type generally indicated in FIG. 16 is mounted on chassis 160.

The piston-type crash guard 162 has its housing 163 secured to chassis element 164 by a connecting arm 165. The slidable pressure plate 166 is connected by means of rod 167 to impact member 168 which may be a bumper of the vehicle. Within housing 163 is disposed the compressible energy-absorbing member 169. Pressure plate 166 bears against compressible member 164. Attached to housing 163 and chassis 160 are supporting springs 170 to permit the crash guard device to swivel about joint 171 as indicated in FIG. 22, to accommodate an angular crash. FIG. 20, shows the normal condition of the compressible member 169. FIG. 21, shows the position of the crash guard and condition of compressible member 169 under impact resulting from a head-on collision. FIG. 22 shows the position of the crash guard and condition of compressible member 169 under impact resulting from collision at an angle. When collision does occur at an angle, the swivel arrangement shown in FIG. 22, causes the colliding vehicles to ricochet away from one another at approximately the same angle of collision. This effect would reduce the possibility of the vehicles coming to sudden stop thus minimizing damaging effects.

FIGS. 23, 24, 25 and 26 show examples of types of compressible materials which may be used as compressible members in crash guards according to the invention.

FIG. 23 represents a resilient plastic 175 having the desired compressible energy-absorbing qualities. FIG. 24 represents a resilient plastic 176 having embedded or encased therein compressible energylabsorbing bodies 177 composed of material differing from that in which they are embedded. The selection of bodies 177 should be such as to impart a greater energy-absorbing potential than that which could be obtained if the material 176 was used alone. Bodies 177 should be made of material which is compressible and/or resilient. FIG. 25 represents a resilient plastic 178 having embedded therein cells 179 containing a suitable fluid material 180 which may be, for example, air, oil or other liquids, paste, powder, etc. As shown diagrammatically in FIG. 26, upon impact of collision, the material 178 and cells 179 will become distorted and/or burst depending upon the material contained in the cells and the strength and range of compressibility of the material 178. The distortion or rupture of material 178, and fluids in cells 179 are indicated by the characters 178a and 180a respectively. The fluids 180 within cells 179, under the force of impact of collision have caused the cells 179 to become ruptured and the fluids 180 forcibly spread in material 178, and the energy produced by the force of impact is thereby absorbed.

Figure 27:
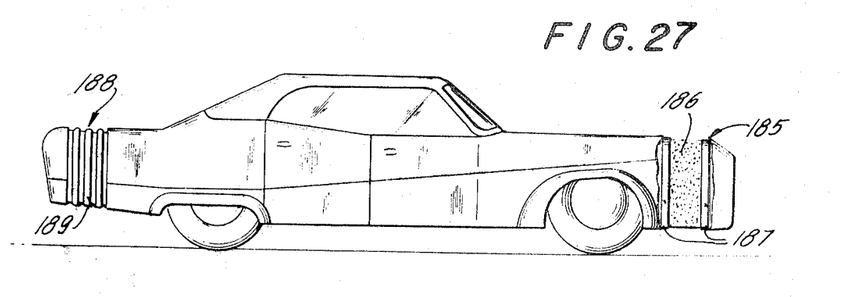
FIG. 27 is a perspective view of a motor vehicle having attached thereto a crash guard at the rear of the vehicle running thereacross and a similar crash guard at front thereof, with the flexible housing omitted.
Figure 28:
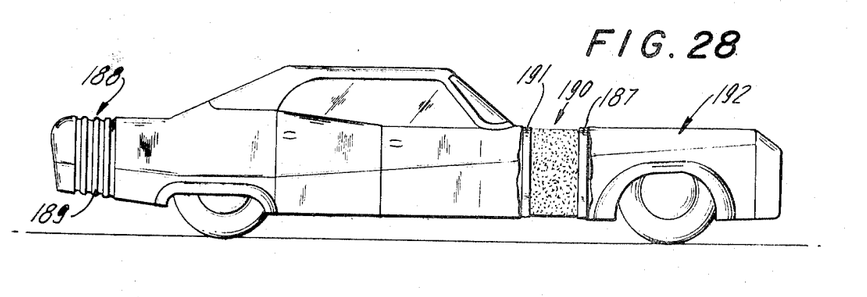
FIG. 28 shows the front crash guard of FIG. 27, running through an intermediate section of the vehicle.

FIGS. 27 and 28 show different arrangements of application of crash guards. In FIG. 27, the front crash guard 185 includes the compressible member 186 arranged between pressure plates 186, 187. Reference numeral 188 depicts a crash guard system complete with flexible cover or housing 189 according to the invention, arranged as an integral part of the motor vehicle. The bellows or accordion arrangement of housing 189 contains the energy-absorbing member 186 and front pressure plate 187 and permits universal angular movement of member 186 and front pressure plate 187 upon load impact. In FIG. 28, the front crash guard 190 is located between the fire wall 191 and the front 192 of the motor vehicle. In this case the fire wall 191 may comprise the back pressure plate of the crash guard. It is understood that in FIG. 28, the front 192 of the vehicle is made slidable on the chassis so that upon force of impact of collision the front 192 will retract toward the fire wall or rear pressure plate 191.

Figure 29:
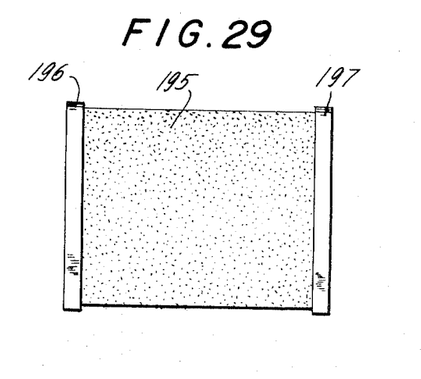
FIG. 29 shows a representative type of crash guard.

FIG. 29 depicts a crash guard comprising two pressure plates 196, 197 between which is interposed compressible member 195 which is of uniform density.

Figure 30:
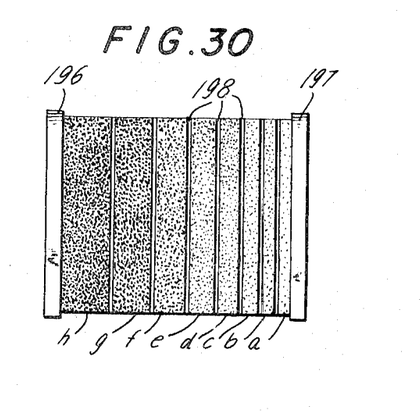
FIG. 30 illustrates another representative type of crash guard showing an integral unit having sections of various compressibility with plates therebetween.

FIG. 30 depicts a crash guard composed of a plurality of compressible elements *a–h*, which may be separated by plates 198. The compressible elements *a–h* are preferably of different densities and therefore have different compressible ranges. For example, element *a* is less dense than element *b*, element *b* is less dense than element *c*, etc., so that the entire unit comprises elements which are progressively greater in density from the front pressure plate 197 backwards. The purpose of such an arrangement of elements of different densities, is to provide for different ranges of velocities of the vehicles of collision. For example, element *a* is designed to be effective for crashes occurring at, say, speeds of from 0 to 10 miles per hour; element *b* to be effective at speeds of from 10 to 20 miles per hour; element *c* would be effective for crashes occurring at speeds of from 20 to 30 miles per hour, and so on. Separating plates 198 may or not be used, or may be used between certain compressible elements and not others to prevent integrating of compressible elements and also to effect an efficient distribution of pressure throughout the system. An advantage of using separating plates 198 between compressing elements is that if in the event of collision certain of the elements are destroyed, they may be easily replaced while the unaffected compressible elements may remain intact.

Referring to the embodiment shown in FIG. 30, it is possible to have a crash guard energy-absorbing structure comprising a combination of different types of energy-absorbing material, such as compressible, flexible-type foams which will offer gradually increased resistance when impacted thereon and rigid crushable-type foams which offer substantially constant resistance when impacted. Under certain conditions, it may be desirable to use energy-absorbing materials of various densities in order to achieve a desired ability to bring a given colliding body to gradual rest with a minimum of physiological and property damage.

It is understood that any crash guard system contemplated by this invention may utilize a plurality of compressible elements or a unitary structure of a suitable compressible material or a combination of different types of materials both flexible and rigid crushable or nonflexible successively or sequentially arranged, or different types of compressible crystalline materials.

When force is exerted on substantially rigid foams they tend to crush offering consistent resistance as the cellular structure is broken down. Thus, kinetic energy of colliding bodies is converted to work as the cellular structure is destroyed.

It is within the scope of the present invention to include synthetic crushable foams and natural crushable material, such as, for example, lava, coral and like materials. It is obvious that the impact load requirements would dictate the selection of the proper material or combination of materials. Such factors as speed at time of collision, nature, stiffness of modulus of the colliding bodies, extent to which persons in the vehicles are restrained by safety devices, would determine the selection of the materials to be utilized as the energy-absorbing member or members.

While the invention has been described and illustrated with respect to certain preferred examples, it will be understood by those skilled in the art after understanding the principle of the invention, that various changes and modifications may be made without departing from the spirit and scope of the invention.

What is claimed is:

1. Crash guard comprising rigid crushable cellular material, flexible compressible cellular material, and means sequentially mounting said materials; said rigid crushable material being substantially destroyed during an impact to absorb energy and said flexible compressible material being compressed during said impact, said flexible compressible material having a protracted return after forces of said impact have been released.

2. Crash guard according to claim 1, said rigid crushable cellular material being substantially crystalline in structure.

3. Crash guard according to claim 1, said materials comprising foam plastic.

4. Crash guard according to claim 1, and a pressure plate interposed between said rigid crushable cellular material and said flexible compressible cellular material.

5. Crash guard according to claim 1, said rigid crushable cellular and flexible compressible cellular materials comprising a plurality of members disposed in side-by-side relation, at least some of said members progressively varying in density.

6. Crash guard according to claim 1, said rigid crushable cellular material of said sequentially mounted materials being replaceable after impact.

7. Crash guard according to claim 1, said rigid crushable cellular material comprising a plurality of members having different densities.

8. Crash guard according to claim 7, and rigid impact-receiving means for distributing an impact load substantially over the area of said cellular materials.

9. Crash guard according to claim 8, said rigid impact-receiving means being mounted for universal angular movement.

10. Crash guard according to claim 7, and a pressure plate interposed between adjacent rigid crushable cellular members.

11. Crash guard according to claim 1, said flexible compressible cellular material comprising a plurality of members having different densities.

12. Crash guard according to claim 11, and rigid impact-receiving means for distributing an impact load substantially over the area of said cellular materials.

13. Crash guard according to claim 12, said rigid impact-receiving means being mounted for universal angular movement.

14. Crash guard according to claim 11, and a pressure plate interposed between adjacent flexible compressible cellular members.

15. Crash guard comprising rigid crushable cellular material, flexible compressible cellular material, means sequentially mounting said materials; said rigid crushable material being substantially destroyed during an impact to absorb energy and said flexible compressible material being compressed during said impact; said flexible material having a protracted return after forces of said impact have been released; and rigid impact-receiving means for distributing an impact load substantially over the area of said cellular materials.

16. Crash guard according to claim 15, said rigid impact-receiving means being mounted for universal angular movement.

17. Crash guard comprising rigid crushable cellular material, flexible compressible cellular material, means sequentially mounting said materials; said rigid crushable material being substantially destroyed during an impact to absorb energy and said flexible compressible material being compressed during said impact, said flexible material having a protracted return after forces of said impact have been released; and an expandable and retractable pleated housing substantially covering said materials, said housing when in expanded condition yielding with said materials during said impact and retaining said materials after said impact.

18. Crash guard comprising rigid crushable cellular material, flexible compressible cellular material, means sequentially mounting said materials; said rigid crushable material being substantially destroyed during an impact to absorb energy and said flexible compressible material being compressed during said impact, said flexible material having a protracted return after forces of said impact have been released; and a flexible housing, said material being contained within said housing.